United States Patent [19]

Javan et al.

[11] 3,826,997

[45] July 30, 1974

[54] LASER PUMPED BY PHOTOIONIZATION GENERATED, ELECTRICALLY HEATED PLASMA

[75] Inventors: Ali Javan, Boston; Jeffrey Steven Levine, Cambridge, both of Mass.

[73] Assignee: Massachusetts Institute of Technology, Cambridge, Mass.

[22] Filed: Oct. 30, 1972

[21] Appl. No.: 301,894

[52] U.S. Cl. ...................... 331/94.5 G, 331/94.5 D
[51] Int. Cl. ............................................. H01s 3/00
[58] Field of Search.................... 331/94.5; 313/223

[56] References Cited
UNITED STATES PATENTS
3,668,550   6/1972   Bullis et al. ........................ 331/94.5

*Primary Examiner*—Ronald L. Wibert
*Assistant Examiner*—Conrad Clark
*Attorney, Agent, or Firm*—Arthur A. Smith, Jr.; John N. Williams; Martin M. Santa

[57] ABSTRACT

A laser pumped by a photoionization generated, electrically heated plasma featuring plasma production by photoionization of a gas with light having an effective (in the sense of being utilizable to produce the plasma) photon energy spectrum lying below the ionization potential of the lasing constituent of the gas (and avoiding any strong absorptive bands in the gas), and heating of the plasma with an electric field at a voltage less than the avalanche breakdown voltage of the gas but high enough to effectively (i.e., directly, or through an intermediate gas) raise the lasing constituent to its lasing level.

24 Claims, 3 Drawing Figures

LASER PUMPED BY PHOTOIONIZATION GENERATED, ELECTRICALLY HEATED PLASMA

The invention herein described was made in the course of work performed under Contract No. F19628-72-C-0049 with the Electronics Systems Division of the Department of the Air Force and under Contract No. N00014-67-A-0204-0014 with the Office of Naval Research, Department of the Navy.

BACKGROUND OF THE INVENTION

1. Field of the Invention

This invention relates to lasers (including non-oscillating amplifiers) pumped by ionization generated, electrically heated plasmas.

2. Description of the Prior Art

In the past, lasing has been produced in gases by application of an electric field at a potential sufficient to produce an avalanche breakdown, thereby generating a plasma by ionization and heating (i.e., raising the mean electron energy) the plasma sufficiently to pump the gas to its lasing level.

More recently, a high energy electron beam has been used as an external ionization source to produce a plasma which is then heated by application of a sustaining electric field at below the avalanche breakdown potential. The electron energy in the plasma is thus determined independently of the source of plasma-generating ionization. Such a system is described, e.g., in Fenstermacher et al., Electron-Beam-Controlled Electrical Discharge as a Method of Pumping Large Volumes of $CO_2$ Laser Media at High Pressure, Appl. Phys. Lett., Vol. 20, No. 2, Jan. 15, 1972, pages 56–60, where it is suggested (p. 57) that the plasma might also be produced by an external source of photoionization.

SUMMARY OF THE INVENTION

The present invention obtains the advantages of independence of the plasma-heating and plasma-generating sources (i.e., the ability to select the mean electron energy optimally for the desired population inversion, and to obtain a uniform, stable discharge over a large volume (preferably, though not necessarily, at least 20 liters), the electron production rate being independent of electron density), and avoids the drawbacks of the electron beam approach by successfully employing photoionization in a simple, reliable device to efficiently produce a uniform, high density plasma over a large volume. The invention can be used in extremely high pressure (e.g., multiple atmospheres) lasers (as well as in lower pressure lasers) despite the facts that the large photoionization cross-sections of the most suitable laser gases, as well as other absorptive processes, (e.g., in the $CO_2$—$N_2$—He laser, arising from strong absorptive bands due to $N_2$ molecules) impede uniform penetration of high energy photons into the volume of gas to be lased. The invention also avoids the difficulty in obtaining windows transmissive to ionizing photons of energy above the ionization potential of a suitable laser gas. The invention makes possible greatly increased energy in the laser output, broader transition line width with the resultant possibilities of increased tuning range for the laser output and extremely short duration mode-locked pulses, and lasers which require high pressure for their existence (e.g., those which depend upon molecule formation from atomic collisions).

In general the invention features plasma production by photoionization of a gas with light having an effective (in the sense of being utilizable to produce the plasma) photon energy spectrum lying below the ionization potential of the lasing constituent of the gas (and avoiding any strong absorptive bands in the gas), and heating of the plasma with an electric field at a voltage less than the avalanche breakdown voltage of the gas but high enough to effectively (i.e., directly, or through an intermediate gas) raise the lasing constituent to its lasing level. In some embodiments there is distributed throughout the lasing constituent a low ionization potential seed gas at a partial pressure preferably lower than that of the lasing constituent; the seed gas is easily photoionized by the relatively (to the lasing constituent ionization potential) low photon energy light which, by virtue of the relative transparency of the remaining gas constituents at that energy level, penetrates deeply (preferably with a penetration depth at least of the order of a meter) through the remaining gas constituents to give a uniform plasma over an extended volume. In other embodiments photoionization of the lasing constituent takes place by a multiple step process involving absorption of multiple photons the first of which is of energy below the ionization potential of the gas; the incident light is still of photon energy low enough to ensure good penetration, and there results initially a uniform, low concentration distribution through the gas volume of gas molecules with one or more absorbed photons, ready (in a manner analogous to the seed gas) to be ionized upon absorption of another photon in the final step of the process. In some embodiments multiple step ionization is carried out with the seed gas; and the seed gas has energy levels differing from the upper lasing level of the lasing constituent by more than the average thermal energy of a gas molecule, to avoid quenching of the upper lasing level. A preferred seed gas is tri-$n$-propyl amine. The invention is applicable to lasers in either oscillating or non-oscillating amplifier modes. The photoionizing light (the term "light" being used herein to refer to electromagnetic radiation broadly) should preferably be collimated and directed and redirected through the active volume to increase efficiency and utilization of photon penetration depth.

Other advantages and features of the invention will be apparent from the description and drawings herein of a preferred embodiment thereof.

DESCRIPTION OF A PREFERRED EMBODIMENT

Figure 1:
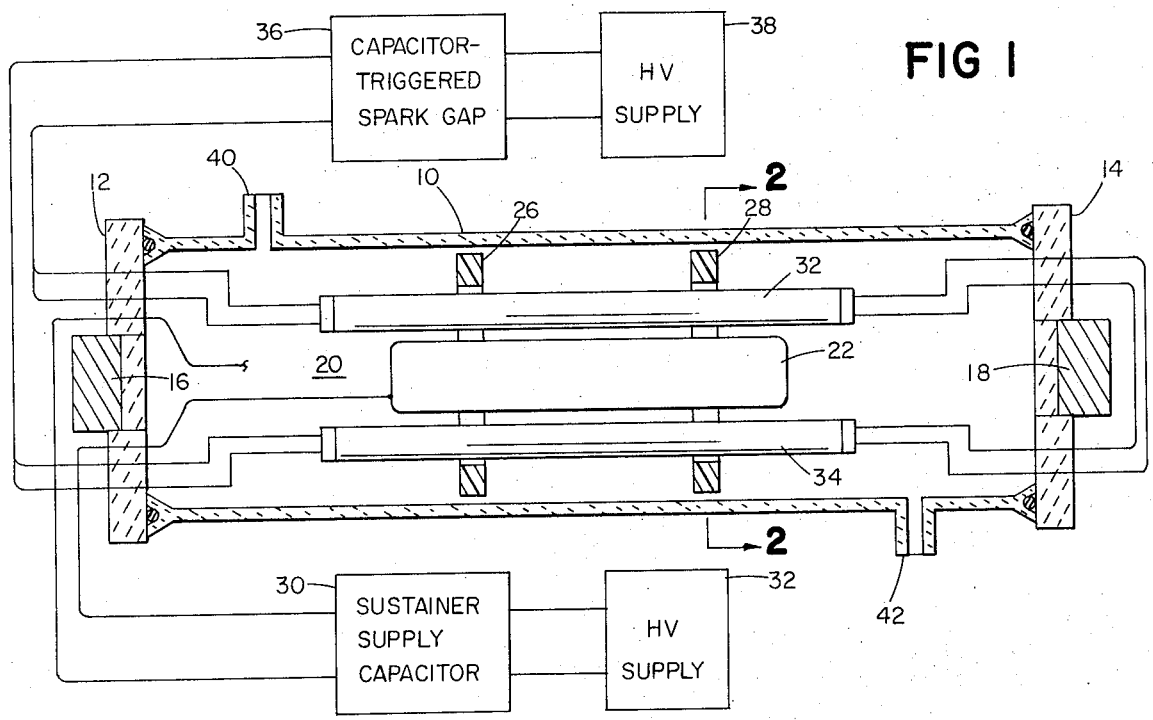
FIG. 1 is a somewhat schematic sectional view of a laser embodying the invention.
Figure 2:
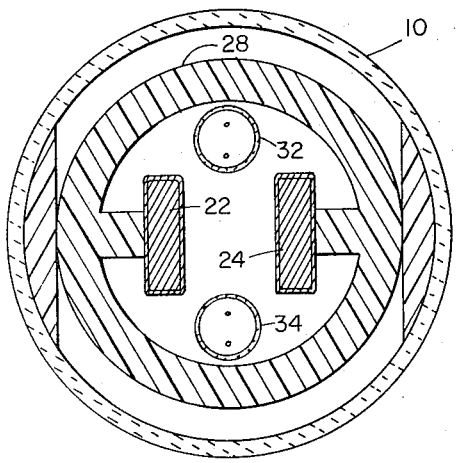
FIG. 2 is a sectional view taken along 2—2 of FIG. 1.

The embodiment to be described is a $CO_2$—$N_2$—He laser using as a seed gas tri-$n$-propyl amine.

A glass tube 10 is vacuum sealed at its ends by plates 12, 14, which respectively support gold coated mirror 16 (90 percent reflective; 0 percent transmissive) and germanium mirror 18 (90 percent reflective; 10 percent transmissive), both curved with 2 meter radii, thereby defining an optical cavity 20.

Parallel, polished, chrome plated, sustainer aluminum electrodes 22 and 24 are supported in the cavity by phenolic rings 26 and 28, and are connected through plate 12 to capacitor 30 fed by high voltage power supply 32.

Xenon flashlamps 32 and 34 are mounted along the edges of the inter-electrode volume, and are connected to capacitor triggered spark gap 36 fed by high voltage power supply 38. The lamps have 1 mm thick, 9.5 mm O.D. quartz envelopes (not transmissive to light of wavelength shorter than about 1,650 A).

In one example of operation, a 1:2:3 mixture of $CO_2$, $N_2$, and He at a total pressure of 760 torr, seeded with a small concentration of tri-$n$-propyl amine at about 0.25 torr partial pressure, was flowed slowly through tube 10, using gas inlet 40 and outlet 42. A constant sustaining electric field of 4,000V/cm. was created between electrodes 22 and 24. The flashlamps were energized with approximately 200 joules, illuminating the inter-electrode volume to photoionize the seed gas. The resulting plasma was heated by the sustaining field to produce a laser discharge.

The spectral energy distribution of light from the flashlamps is such that photoionization of the tri-$n$-propyl amine occurs predominantly by a two step process involving absorption of successive photons at least the first of which has an energy below the ionization potential (7.23 $eV$ above ground state) of the seed gas.

The use of the seed gas and the two step process makes possible production of a plasma with photons well below the energy level required to directly ionize the $CO_2$ lasing medium, which would require photon wavelengths shorter than 900 A. The low partial pressure and low ionization potential (compared with the relatively high-lying photon absorption bands and ionization potential of all other constituents) of the seed gas result in very long (e.g., upwards of a meter) penetration depths for the ionizing photons, making possible a uniform plasma over a large volume with high photoionization efficiency. By contrast, efforts to directly ionize $CO_2$ with light of wavelength shorter than 900 A would be impeded by the difficulty of finding windows transmissive to that light, absorption in the outer gas layer due to the high photoionization cross-section of $CO_2$ and its elevated pressure, and other absorption processes such as those arising from the strong absorption bands due to the $N_2$ molecules.

In general, the seed gas should be selected so that its energy levels differ from the upper lasing level of the lasing gas by more than the average thermal energy of a gas molecule, to avoid quenching of the upper level (though it may be advantageous to quench the lower laser level through coincidence of that level with an energy level of the seed gas, contributing to population inversion). Similarly, quenching of exitation of an intermediate gas (e.g., $N_2$ in the $CO_2$ laser) should be avoided. Furthermore, the seed gas should not have an absorption band at the laser output frequency, should not drastically lower the avalanche breakdown potential of the lasing medium, and should have sufficient vapor pressure at the normal operating temperature of the lasing medium to facilitate mixing with the lasing medium (though heated embodiments are possible).

The two (or more) step process may be used to photoionize the lasing medium itself, dispensing with the seed gas. Those gas molecules which, having absorbed at least one photon in a first transition, are ready to be ionized upon absorption of an additional photon, will be distributed throughout the remaining gas volume in much the manner of a low partial pressure, low ionization potential seed gas. In general the two step process should utilize a weakly allowed transition for the first step to improve penetration depth, "weakly allowed" being defined here in the sense of giving a mean penetration depth greater than the corresponding dimension of the desired plasma.

Figure 3:
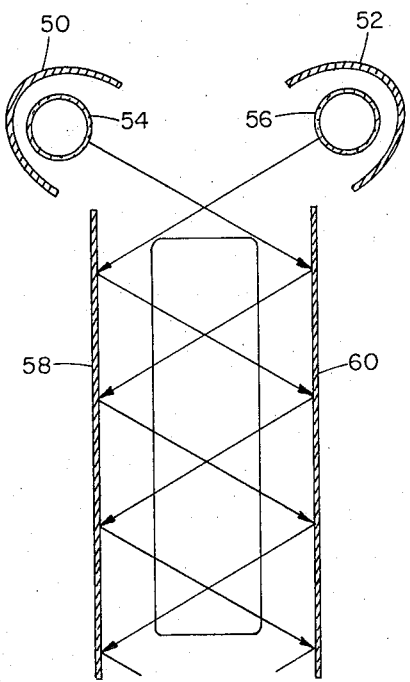
FIG. 3 is a schematic diagram illustrating scale up of the embodiment of FIG. 1.

A scaled up system of larger volume and higher efficiency, utilizing more of the penetration depth of the photons, is illustrated schematically in FIG. 3. Parabolic mirrors 50, 52 collimate the light from the flashtubes 54, 56, and mirrors 58 and 60 direct and redirect the collimated light within the inter-electrode volume.

Other embodiments (e.g., use of an ultra violet gas laser as the source of photoionization; elimination of the mirrors to enable operation in a non-oscillating mode; etc.) are within the following claims.

What is claimed is:

1. A laser comprising
    a volume of gas having a lasing constituent,
    a light source arranged to emit light having an effective photon energy spectrum below the ionization potential of said lasing constituent and chosen to photoionize at least a constituent of said gas predominantly by a multiple step process involving absorption of successive photons at least the first of which has a photon energy less than the ionization potential of said constituent being ionized, for photoionizing said gas to produce a plasma, and
    an electric field source for applying to said gas a sustaining voltage below the avalanche breakdown voltage of said gas, but high enough to heat said plasma to an energy level sufficient to effectively raise said lasing constituent to its lasing level.

2. The laser of claim 1 wherein said volume of gas includes a seed gas distributed through said lasing constituent and having an ionization potential below that of said lasing constituent.

3. The laser of claim 2 wherein said seed gas is at a lower partial pressure than said lasing constituent.

4. The laser of claim 2 wherein said spectrum has a distribution predetermined to photoionize said seed gas predominantly by a multiple step process involving absorption of successive photons at least the first of which has a photon energy less than the ionization potential of said seed gas.

5. The laser of claim 2 wherein the energy levels of said seed gas all differ from the upper lasing level of said lasing constituent by more than the average thermal energy of a molecule of said gas, whereby quenching of said upper lasing level is avoided.

6. The laser of claim 2 wherein said seed gas is tri-$n$-propyl amine.

7. A $CO_2$—$N_2$—He laser according to claim 6.

8. The laser of claim 1 wherein said constituent being ionized is said lasing constituent.

9. The laser of claim 8 wherein said multiple step process includes a first step utilizing a weakly allowed transition.

10. The laser of claim 1 including opposing mirrors in said volume for operation in an oscillating mode.

11. The laser of claim 1 wherein said gas is at least at atmospheric pressure.

12. The laser of claim 1 further comprising means for collimating the light from said source, and mirrors for directing and redirecting the collimated light in said volume to increase the utilization of the penetration depth of the plasma-producing photons.

13. A method of stimulating emission of coherent radiation in a gas having a lasing constituent, comprising the steps of
    directing at said gas light having an effective photon energy spectrum below the ionization potential of said lasing constituent and chosen to photoionize at least a constituent of said gas predominantly by a multiple step process involving absorption of successive photons at least the first of which has a photon energy less than the ionization potential of said constituent being ionized, to photoionize said gas to produce a plasma, and
    applying to said gas a sustaining voltage below the avalanche breakdown voltage of said gas but high enough to heat said plasma to an energy level sufficient to effectively raise said lasing constituent to its lasing level.

14. The method of claim 13 further comprising maintaining in said lasing constituent a seed gas having an ionization potential below that of said lasing constituent.

15. The method of claim 13 further comprising establishing the distribution of said spectrum to photoionize said seed gas by a multiple step process involving absorption of successive photons at least the first of which has a photon energy less than the ionization potential of said seed gas.

16. The method of claim 14 wherein the energy levels of said seed gas all differ from the upper lasing level of said lasing constituent by more than the average thermal energy of a molecule of said gas, whereby quenching of said upper lasing level is avoided.

17. The method of claim 14 wherein said seed gas is tri-$n$-propyl amine.

18. The method of claim 17 applied to a $CO_2$—$N_2$—He laser.

19. The method of claim 13 wherein said constituent being ionized is said lasing constituent.

20. The method of claim 19 wherein said multiple step process includes a first step utilizing a weakly allowed transition.

21. The method of claim 13 wherein said laser is caused to operate in an oscillating mode.

22. The method of claim 13 further comprising maintaining said gas at least at atmospheric pressure.

23. The method of claim 13 further comprising collimating said light and directing and redirecting it through said gas to increase the utilization of the penetration depth of the plasma-producing photons.

24. A laser comprising
    a volume of gas having a lasing constituent, said volume being at least 20 liters, said gas having a total pressure of at least 1 atmosphere,
    a source of light to pass through said volume, said light having a photon energy spectrum lying below the ionization potential of said lasing constituent and avoiding any of the strong absorption bands of said gas, so as to produce a mean photon penetration of at least of the order of a meter, and chosen to photoionize at least a constituent of said gas predominantly by a multiple step process involving absorption of successive photons at least the first of which has a photon energy less than the ionization potential of said constituent being ionized, for photoionizing said gas to produce a plasma, and
    an electric field source for applying to said gas a sustaining voltage below the avalanche breakdown voltage of said gas, but high enough to heat said plasma to an energy level sufficient to effectively raise said lasing constituent to its lasing level.

* * * * *